United States Patent
Graul et al.

(10) Patent No.: US 10,820,186 B2
(45) Date of Patent: Oct. 27, 2020

(54) METHOD FOR ASSISTING ROAMING OF A MOBILE TERMINAL BETWEEN COMMUNITY WIRELESS LOCAL AREA NETWORKS

(71) Applicant: SAGEMCOM BROADBAND SAS, Rueil Malmaison (FR)

(72) Inventors: Alexis Graul, Rueil Malmaison (FR); Massinissa Lalam, Rueil Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 0 days.

(21) Appl. No.: 16/649,052

(22) PCT Filed: Sep. 25, 2018

(86) PCT No.: PCT/EP2018/076003
§ 371 (c)(1),
(2) Date: Mar. 19, 2020

(87) PCT Pub. No.: WO2019/063564
PCT Pub. Date: Apr. 4, 2019

(65) Prior Publication Data
US 2020/0221285 A1  Jul. 9, 2020

(30) Foreign Application Priority Data
Sep. 29, 2017  (FR) .................................... 17 59131

(51) Int. Cl.
*H04W 4/00* (2018.01)
*H04W 8/12* (2009.01)
(Continued)

(52) U.S. Cl.
CPC ............ *H04W 8/12* (2013.01); *H04B 17/318* (2015.01); *H04W 36/0094* (2013.01); *H04W 36/08* (2013.01); *H04W 84/12* (2013.01)

(58) Field of Classification Search
CPC ............... H04W 72/042; H04W 76/27; H04W 72/0453; H04L 5/0053; H04L 5/0007
See application file for complete search history.

(56) References Cited

U.S. PATENT DOCUMENTS

| | | | |
|---|---|---|---|
| 2005/0003827 A1* | 1/2005 | Whelan | H04W 16/10 455/454 |
| 2005/0147062 A1* | 7/2005 | Khouaja | H04W 36/30 370/332 |

(Continued)

FOREIGN PATENT DOCUMENTS

| | | |
|---|---|---|
| FR | 2 832 895 A1 | 5/2003 |
| WO | 2006/013533 A1 | 2/2006 |

OTHER PUBLICATIONS

Oct. 30, 2018 International Search Report issued in International Patent Application No. PCT/EP2018/076003.
(Continued)

*Primary Examiner* — Atique Ahmed
(74) *Attorney, Agent, or Firm* — Oliff PLC; R. Brian Drozd

(57) ABSTRACT

To assist roaming of a mobile terminal from a first wireless LAN to a second wireless LAN respectively managed by first and second access points, the first access point (AP) makes measurements of communication quality with the mobile terminal and/or of operational load. By comparing the measurements with thresholds, the first AP can trigger a selection procedure assisted by a server or trigger an autonomous selection procedure, at the end of which the first AP transmits to the mobile terminal a weighted list of access points that are candidates for the roaming. In the assisted (Continued)

selection procedure, the first AP, in constructing the weighted list, takes into account instantaneous measurements of operational load on the candidate access points supplied by the server, and, in the autonomous selection procedure, the first AP, in constructing the weighted list, takes into account long-term statistics of operational load on the candidate access points.

17 Claims, 7 Drawing Sheets

(51) Int. Cl.
*H04B 17/318* (2015.01)
*H04W 36/00* (2009.01)
*H04W 36/08* (2009.01)
*H04W 84/12* (2009.01)

(56) References Cited

U.S. PATENT DOCUMENTS

| 2007/0076662 A1* | 4/2007 | Jain | H04W 36/26 |
| | | | 370/331 |
| 2007/0140163 A1* | 6/2007 | Meier | H04W 8/005 |
| | | | 370/329 |
| 2014/0098682 A1* | 4/2014 | Cao | H04W 36/00835 |
| | | | 370/252 |
| 2018/0352493 A1* | 12/2018 | Strater | H04W 36/0058 |

OTHER PUBLICATIONS

Oct. 30, 2018 Written Opinion issued in International Patent Application No. PCT/EP2018/076003.

Nguyen et al; "A Novel WLAN Roaming Decision and Selection Scheme for Mobile Data Offloading;" Journal of Electrical and Computer Engineering; vol. 2015; pp. 1-15; Jan. 1, 2015.

* cited by examiner

METHOD FOR ASSISTING ROAMING OF A MOBILE TERMINAL BETWEEN COMMUNITY WIRELESS LOCAL AREA NETWORKS

The present invention relates to a method for assisting the roaming of a mobile terminal from one wireless local area network to another wireless local area network in the same community.

Establishing wireless local area networks WLANs offer great flexibility to the users of roaming communication devices, such as computers, tablets, smartphones, etc. Such WLAN networks are for example established by access points integrated in residential gateways (RGWs) made available by telecommunications operators to users who have taken out a subscription with them. Thus, apart from the local connectivity afforded by these WLAN networks, these users can also access wide area network WAN services, such as for example the internet, by means of their residential gateways RGW and mobile terminals.

In addition, telecommunications operators deploy, in public places, wireless network infrastructures, such as WLAN networks of the Wi-Fi type (based on the IEEE 802.11 family of standards), in order to be able to guarantee access to such wide area networks WAN for their subscribers and to provide them with connectivity in these dense zones. "Hot spots" are spoken of.

In order to extend the coverage, residential gateways RGW are used. Such residential gateways RGW then establish at least two WLAN networks, at least one private WLAN network the access to which is restricted to the subscriber owning the residential gateway RGW, and at least one public WLAN network open to all the subscribers of the operator managing the residential gateway RGW.

In the case of public WLAN networks, "community WLAN networks" are spoken of By extension, "community Wi-Fi networks" are spoken of for public WLAN networks of the Wi-Fi type.

A user connected by means of his mobile terminal, referred to as station, to a community WLAN network may, by moving, be situated out of range of the access point that manages said community WLAN network and thus lose connectivity to the wide area network WAN. Under these conditions, the station will then by itself attempt to reconnect to another access point for which it has the access rights. Reconnection may take several seconds and thus cause a momentary loss of connectivity to the wide area network WAN. Unlike a cellular telephony network where the mobile terminal is entirely under the control of a core network, the philosophy of WLAN networks is to leave management of connectivity to the mobile terminal.

It is desirable to overcome these drawbacks of the prior art. It is thus desirable to provide a solution that facilitates roaming of a mobile terminal from a community WLAN network managed by an operator to another community WLAN network managed by the same operator (that is to say WLAN networks belonging to the same community), in order to minimise, and preferentially to prevent, loss of connectivity to the wide area network WAN for said mobile terminal. The solution must however take into account the philosophy of WLAN networks mentioned above, namely leaving management of connectivity to the mobile terminal.

The invention relates to a method for assisting roaming of a mobile terminal from a first community wireless local area network to a second community wireless local area network, the first and second wireless local area networks belonging to the same community and being managed by respectively first and second access points offering access to a wide area network via which a server governing said community is accessible. The method is such that the first access point implements the following steps: making measurements on the quality of communication with said mobile terminal and/or of operational load on said first access point; when the measurements indicate that the quality of communication with said mobile terminal is below a first threshold S2 and/or respectively that the operational load on said first access point is above a second threshold S2', triggering a selection procedure assisted by the server; when the measurements indicate that the quality of communication with said mobile terminal is below a third threshold S3 that is below the first threshold S2 and/or respectively that the operational load on said first access point is above a fourth threshold S3' that is above the second threshold S2', triggering an autonomous selection procedure; at the end of the selection procedure assisted by the server or of the autonomous selection procedure, transmitting to the mobile terminal a weighted list Ld of access points that are candidates for the roaming of said mobile terminal. In addition, in the assisted selection procedure, the first access point constructs the weighted list Ld by performing a weighting taking into account instantaneous measurements of operational load on said candidate access points provided by the server following the triggering of the assisted selection procedure, and, in the autonomous selection procedure, the first access point constructs the weighted list Ld by performing a weighting taking into account long-term statistics of operational load on said candidate access points provided previously by the server.

Thus, the roaming of the mobile terminal from the first community wireless local area network to the second community wireless local area network is facilitated, particularly with regard to the choice of the second community wireless local area network by the mobile terminal. The transmission of the weighted list Ld anticipates the loss of connectivity of the mobile terminal, while leaving management of the connectivity to the mobile terminal.

According to a particular embodiment, the first access point periodically receives updates of the long-term statistics coming from the server.

According to a particular embodiment, the first access point implements the following steps: when the measurements indicate that the quality of communication with said mobile terminal is below a fifth threshold S1 that is higher than or equal to the first threshold S2 and/or respectively that the operational load on said first access point is above a sixth threshold S1' that is below or equal to the second threshold S2', requesting of said mobile terminal a scanning report indicating which access points are detected by said mobile terminal; and performing the weighting taking into account the scanning report received from the mobile terminal.

According to a particular embodiment, the first access point lists, in the weighted list Ld, only access points detected by said mobile terminal and which are indicated in the scanning report.

According to a particular embodiment, the first access point performs the following steps: receiving, coming from the server, a list L of access points managing community wireless local area networks belonging to said community and the geographical address of which is situated within a predefined radius of said first access point; performing a scanning in order to create a list Lap identifying which access points in the list L are within radio range of said first access point and a list Lhp identifying which access points in the list L are out of radio range of said first access point; performing an initial weighting on the basis of the lists Lap and Lhp.

According to a particular embodiment, the first access point performs the following steps: creating a list Lab identifying access points belonging to said community that were detected by said first access point during the scanning by said first access point and which were not listed in the list L; transmitting the list Lab to the server.

According to a particular embodiment, in the assisted selection procedure, the server performs the following steps: requesting each access point in the list L to provide instantaneous measurements of operational load on said access point, and to provide information indicating whether said access point detects said mobile terminal; and informing said first access point of the instantaneous measurements of operational load received from said access points and providing the information indicating respectively whether said access points have detected said mobile terminal.

According to a particular embodiment, in the assisted selection procedure, the first access point associates, with each access point listed in the weighted list Ld, a weight P calculated from a set of metrics in the following way: the weight P depends on the weight attributed to said access point during the initial weighting and/or on the weight lastly attributed to said access point at the time of the last creation of the weighted list Ld by the first access point; the weight P depends on the operational load on a communication interface on the wide area network side of said access point; the weight P depends on the operational load on a communication interface on the community wireless local area network side of said access point; the weight P depends on an RSSI signal level (received signal strength indicator) with which said access point detects said mobile terminal; the weight P depends on an RSSI signal level with which said mobile terminal detects said access point AP according to the scanning report received from said mobile terminal.

According to a particular embodiment, said weight P further depends on an amount of roaming operations previously performed successfully from the first access point to the access point with which the weight P is associated.

According to a particular embodiment, when the scanning report requested of said mobile terminal is not available, the weight P depends on the inverse of the absolute value of the difference between an RSSI signal level measured by the first access point for signals coming from said access point with which the weight P is associated and an RSSI signal level measured by the first access point for signals coming from said mobile terminal.

According to a particular embodiment, in the autonomous selection procedure, the first access point associates, with each access point listed in the weighted list Ld, a weight P' calculated from a set of metrics in the following manner: the weight P' depends on a statistic of load of the communication interface on the wide area network side of said access point; the weight P' depends on a statistic of load of the communication interface on the community wireless local area network side of said access point; the weight P' depends on an RSSI signal level with which said mobile terminal detects said access point according to the scanning report received from said terminal.

According to a particular embodiment, said weight P' further depends on an amount of roaming operations previously performed successfully from the first access point to the access point with which the weight P' is associated.

According to a particular embodiment, after roaming of the mobile terminal, the second access point informs the server of said roaming, and the server next informs the first access point of said roaming.

According to a particular embodiment, when the scanning report requested of said mobile terminal is not available, the weight P' depends on the inverse of the absolute value of the difference between an RSSI signal level measured by the first access point for signals coming from said access point with which the weight P' is associated and an RSSI signal level measured by the first access point for signals coming from said mobile terminal.

According to a particular embodiment, the first and second community wireless local area networks are of the Wi-Fi type.

The invention also relates to a computer program product comprising instructions for the implementation, by a processor, of the steps of the method performed by the first access point, when said program is executed by said processor. The invention also relates to an information storage medium storing such a computer program product.

The invention also relates to an access point, referred to as first access point, configured to assist roaming of a mobile terminal from a first community wireless local area network to a second community wireless local area network, the first and second wireless local area networks belonging to the same community and being managed by respectively the first access point and a second access point, the first and second access points offering access to a wide area network via which a server governing said community is accessible. The first access point implements: means for making measurements of quality of communication with said mobile terminal and/or of operational load on said first access point; when the measurements indicate that the quality of communication with said mobile terminal is below a first threshold S2 and/or respectively that the operational load on said first access point is above a second threshold S2', means for triggering a selection procedure assisted by the server; when the measurements indicate that the quality of communication with said mobile terminal is below a third threshold S3 that is below the first threshold S2 and/or respectively that the operational load on said first access point is above a fourth threshold S3' that is above the second threshold S2', means for triggering an autonomous selection procedure; at the end of the selection procedure assisted by the server or of the autonomous selection procedure, means for transmitting to the mobile terminal a weighted list Ld of access points that are candidates for the roaming of said mobile terminal. In addition, in the assisted selection procedure, the first access point implements means for constructing the weighted list Ld by performing a weighting taking into account instantaneous measurements of operational load on said candidate access points provided by the server following the triggering of the assisted selection procedure, and, in the autonomous selection procedure, the first access point implements means for constructing the weighted list Ld by performing a weighting taking into account long-term statistics of operational load on said candidate access points supplied previously by the server.

The features of the invention mentioned above, as well as others, will emerge more clearly from a reading of the following description of an example embodiment, said description being given in relation to the accompanying drawings, among which:

Figure 9A:
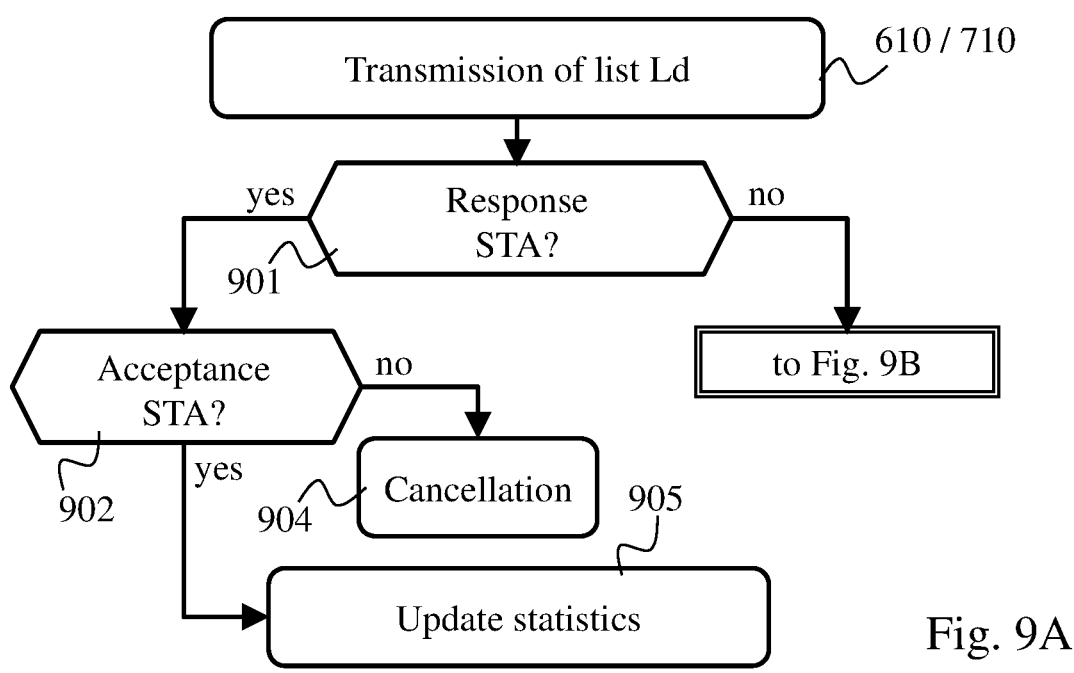
Figure 9B:
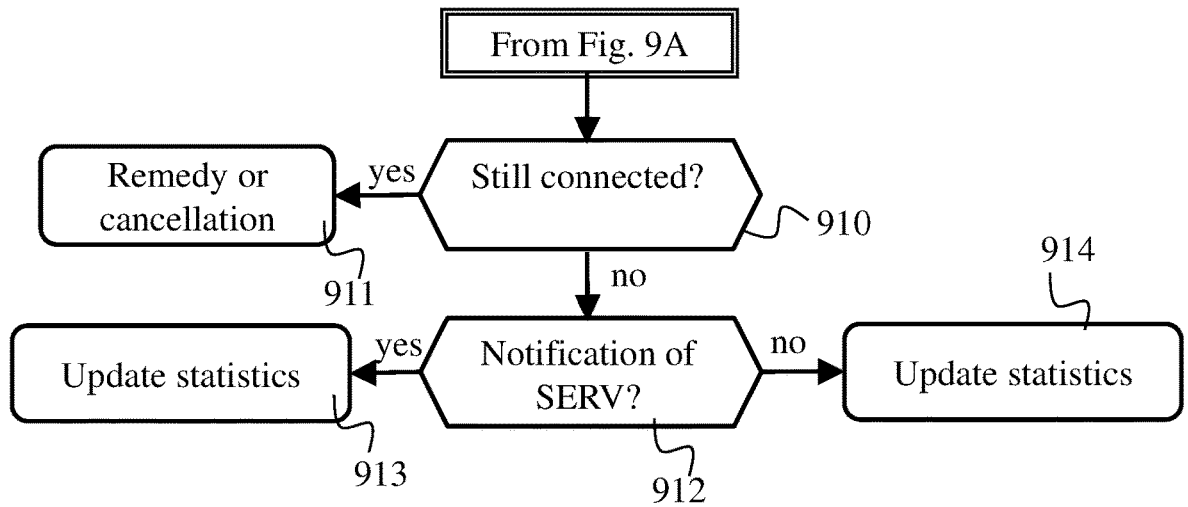
Figure 10:
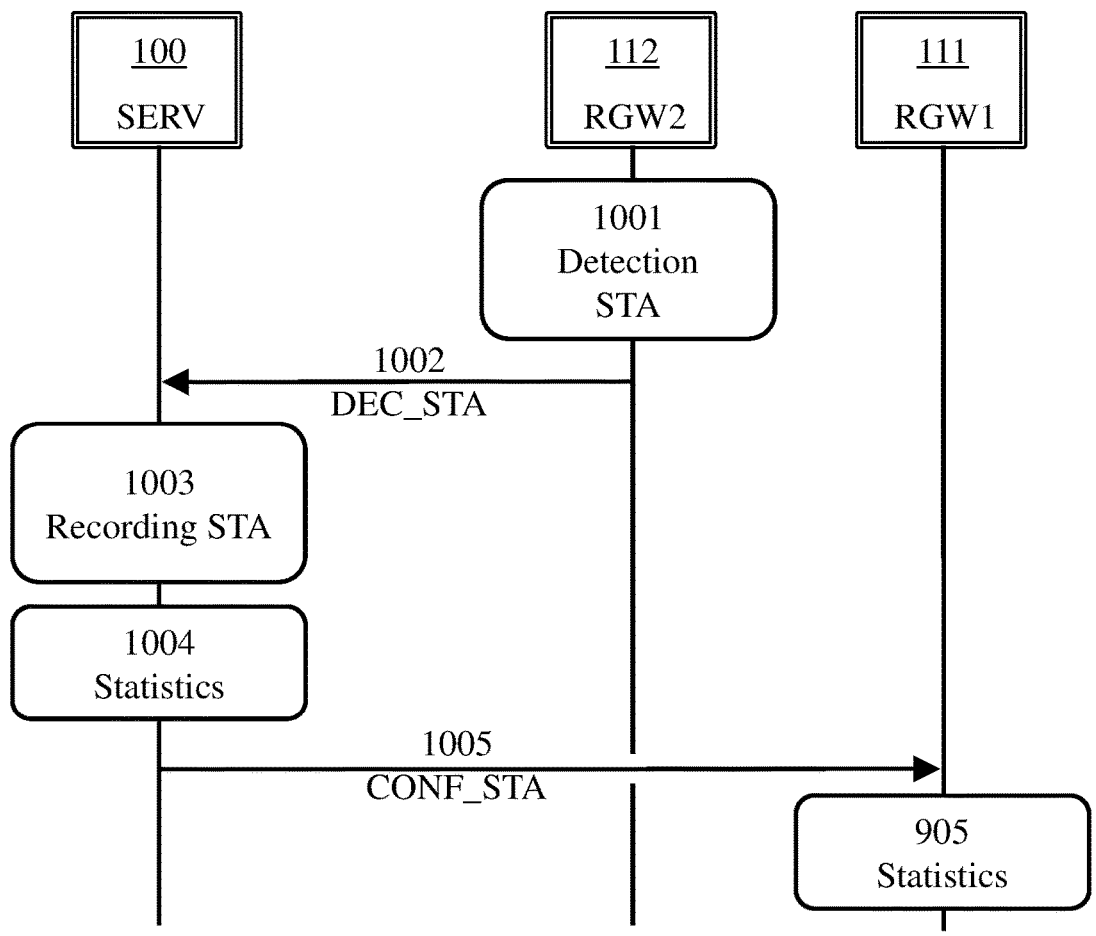

FIGS. 9A and 9B illustrate schematically an algorithm for monitoring the roaming of the mobile terminal from the first community WLAN network to the second community WLAN network, the algorithm being implemented by the access point managing the first community WLAN network; and FIG. 10 illustrates schematically message exchanges in the context of the roaming of the mobile terminal from the first community WLAN network to the second community WLAN network.

Figure 1:
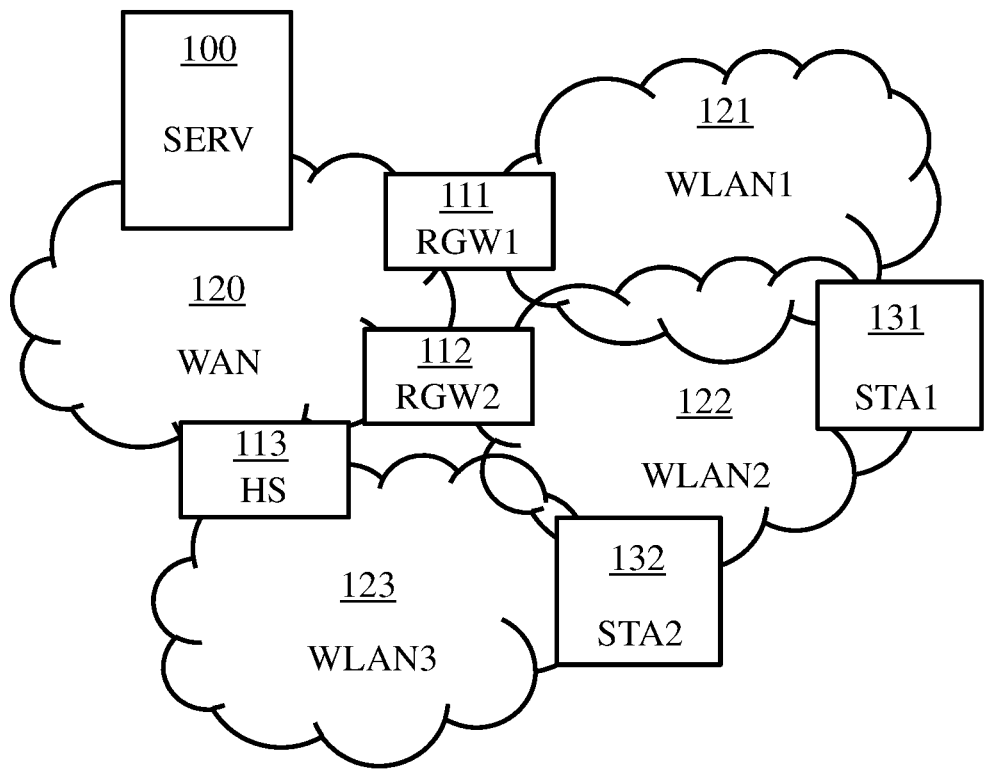
FIG. 1 illustrates schematically a communication system in which the present invention can be implemented.

FIG. 1 illustrates schematically a communication system in which the present invention can be implemented.

The context of the present invention is that of a deployment of community WLAN networks WLAN1 121, WLAN2 122, WLAN3 123 by a communication operator. The purpose of these community WLAN networks WLAN1 121, WLAN2 122, WLAN3 123 is to allow access to services offered by a wide area network WAN 120, such as the internet, for subscribers of the communication operator. These community WLAN networks WLAN1 121, WLAN2 122, WLAN3 123 belong by definition to the same community, governed by the operator in question. Thus only the subscribers of the community can access the services offered via these community WLAN networks WLAN1 121, WLAN2 122, WLAN3 123.

These community WLAN networks are established and managed by respective access points AP. These access points AP are, according to a first possibility, dedicated access points installed by the operator itself in public areas (e.g. railway station, square, etc.) and thus create community WLAN networks of the hot-spot type. This is the case with the access point HS 113 in FIG. 1, which manages the community WLAN network WLAN3 123. These access points AP are, according to a second possibility, access points integrated in residential gateways RGW provided by the operator and installed by subscribers in private areas (dwellings, etc.). This is the case with access points AP integrated in residential gateways RGW1 111, RGW2 112 in FIG. 1, which respectively manage the community WLAN networks WLAN1 121, WLAN2 122.

For the community WLAN networks of the hot-spot type, the operator has exact knowledge of the geographical location of the access points AP managing said community WLAN networks, as well as of the theoretical radio range of said access points AP. With regard to the community WLAN networks established by means of residential gateways RGW, the operator does not generally know exactly where the subscribers concerned have installed said residential gateways RGW, but the operator has knowledge of the home addresses of said subscribers where said residential gateways RGW are supposed to be installed.

FIG. 1 thus illustrates schematically a communication system in which mobile terminals, also referred to as stations STA, such as the mobile terminals STA1 131, STA2 132, can access services offered by the wide area network WAN 120 via community WLAN networks, such as the community WLAN networks WLAN1 121, WLAN2 122, WLAN3 123.

The access points AP, such as the access point HS 113 and the access points AP integrated in the residential gateways RGW1 111, RGW2 112, are configured to implement a method for assisting roaming from their community WLAN network to another community WLAN network (of the same community). This method, detailed below, enables the mobile terminals, such as the mobile terminals STA1 131, STA2 132, to receive weighted information enabling them to take a decision as to the choice of the community WLAN network to switch to, when the community WLAN network to which said mobile terminals are connected no longer makes it possible to properly ensure connectivity to the wide area network WAN 120.

In the context of the method for assisting roaming, the access points AP in question rely on a server SERV 100 made accessible to said access points AP via the wide area network WAN 120. The server SERV 100 has knowledge of the access points AP managing the community WLAN networks of the community governed by said server SERV 100. As detailed below, the server SERV 100 assists the access points AP of the community in order to help the mobile terminals entitled to connect to the community WLAN networks of said community to roam from a said community WLAN network to another said community WLAN network.

The server SERV 100 is responsible for authenticating users that connect to the access points AP of the community governed by said server SERV 100. This authentication relies on an exchange of messages between said access points AP and the server SERV 100 when said access points AP detect attempts by the mobile terminals concerned to connect to the community WLAN networks managed by said access points AP. This authentication relies on authentication information supplied by said mobile terminals, as is widespread in the current wireless communication networks. Each access point AP of the community may furthermore periodically transmit to the server SERV 100 the list of mobile terminals that are connected thereto.

Figure 2:
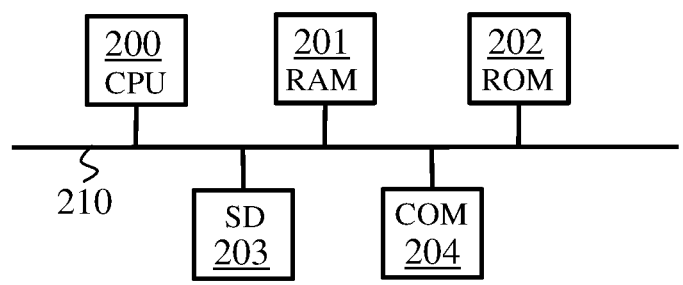
FIG. 2 illustrates schematically an example of hardware architecture that can be used in the communication system.

FIG. 2 illustrates schematically an example of hardware architecture of a residential gateway RGW used in the communication system of FIG. 1. The example of hardware architecture in FIG. 2 is also applicable to the access points of the hot-spot type. The example of hardware architecture in FIG. 2 is also applicable to the server SERV 100.

The example of hardware architecture presented comprises, connected by a communication bus 210: a processor CPU (central processing unit) 200; a random access memory RAM 201; a read only memory ROM 202; a storage unit or a storage medium reader, such as an SD (Secure Digital)

card reader 203 or a hard disk HDD (hard disk drive); and at least one communication interface COM 204.

When the hardware architecture represents a residential gateway RGW, a communication interface COM 204 enables the residential gateway RGW to communicate via the wide area network WAN 120, and at least one communication interface COM 204 makes it possible to create and manage at least one respective community WLAN network, and preferentially at least one communication interface COM 204 makes it possible to create and manage at least one private WLAN network.

When the hardware architecture represents an access point AP of the hot-spot type, a communication interface COM 204 enables said access point AP to communicate via the wide area network WAN 120, and at least one communication interface COM 204 makes it possible to create and manage at least one respective community WLAN network.

When the hardware architecture represents the server SERV 100, a communication interface COM 204 enables the server SERV to communicate via the wide area network WAN 120.

The processor CPU 200 is capable of executing instructions loaded in the RAM memory 201 from the ROM memory 202, from an external memory (such as an SD card), from a storage medium (such as a hard disk HDD), or from a communication network (such as the wide area network WAN 120). On powering up, the processor CPU 200 is capable of reading instructions from the RAM memory 201 and executing them. These instructions form a computer program causing the implementation, by the processor CPU 200, of all or some of the algorithms and steps described below in relation to the device that said hardware architecture represents.

Thus all or some of the algorithms and steps described below may be implemented in software form by the execution of a set of instructions by a programmable machine, such as a DSP (digital signal processor) or a microcontroller or a processor. All or some of the algorithms and steps described below may also be implemented in hardware form by a machine or a dedicated component, such as an FPGA (field-programmable gate array) or an ASIC (application-specific integrated circuit). Thus the server SERV 100 and the residential gateways RGW of the communication system, as well as the access points AP of the hot-spot type, comprise electronic circuitry suitable for implementing the algorithms and steps described below.

It should be noted that the mobile terminals may follow the same hardware architecture.

Figure 3:
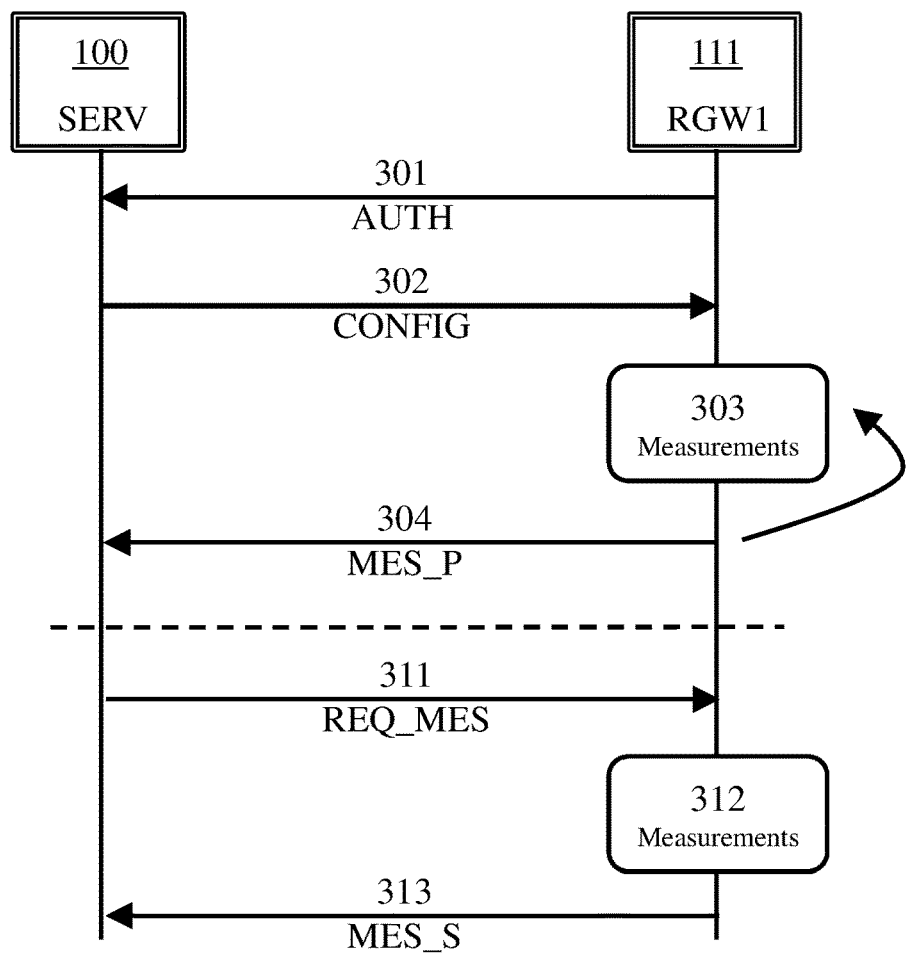
FIG. 3 illustrates schematically message exchanges in the context of a collection of measurements made by access points of the communication system.

FIG. 3 illustrates schematically message exchanges in the context of a collection of measurements made by access points AP of the communication system. These exchanges enable the server SERV 100 to know the operational load on the access points AP at an instant t. These exchanges make it possible in particular to construct statistics that then serve to assist the access points AP of the community to help the mobile terminals to roam from a said community WLAN network to another said community WLAN network.

Let us consider by way of illustration that the access point AP considered in the context of the algorithm in FIG. 3 is integrated in the residential gateway RGW1 111. The algorithm in FIG. 3 is however implemented by each access point AP of the community.

In a step 301, the access point AP of the residential gateway RGW1 111 is activated and the residential gateway RGW1 111 sends an authentication message AUTH to the server SERV 100. The address of the server SERV 100 is known (for example defined in the factory) to the residential gateway RGW1. The authentication of the residential gateway RGW1 111 with the server SERV 100 may consist of an exchange of a plurality of messages. This authentication relies on authentication information supplied by the residential gateway RGW1 111, as is widespread in current communication networks.

In a step 302, following the successful authentication of the residential gateway RGW1 111, the server SERV 100 sends a configuration message CONFIG to the residential gateway RGW1 111. By means of the message CONFIG, the server SERV 100 instructs the residential gateway RGW1 111 to make measurements of operational load on said residential gateway RGW1 111 and to periodically transmit measurement reports thereto. The message CONFIG may also supply to the residential gateway RGW1 111 an identifier of the community to which each community WLAN network to be managed by said residential gateway RGW1 111 belongs, as well as a network identifier of each said community WLAN network. The network identifier of each said community WLAN network is for example an SSID (service set identifier).

The operational-load measurements are measurements of level of occupation of processors or components internal to said residential gateway RGW1 111 and/or measurements of load on each communication interface on the WLAN side and/or on its communication interface on the WAN side.

The operational load on the WLAN side may correspond to a mean bit rate in the uplink and downlink direction over a predefined period, which can be configurable by the server SERV 100 by means of the message CONFIG, and/or to the real bit rate in the uplink and downlink direction with respect to a maximum available bit rate recorded over a predefined period that can be configurable by the server SERV 100 by means of the message CONFIG, and/or to a quantity of mobile terminals actually connected to said WLAN network and/or to a quality of service QoS of transmissions under way on said WLAN network. With regard to the quality of service QoS, the statistics of each access category AC used, as defined by the amendment IEEE 802.11e or the WMM (wireless multi-media) certification of the Wi-Fi Alliance organisation, can be used.

The operational load on the WAN side may correspond to the mean bit rate in the uplink and downlink direction over a predefined period that can be configurable by the server SERV 100 by means of the message CONFIG and/or to the real bit rate in the uplink and downlink direction with respect to a maximum bit rate available over a predefined period that can be configurable by the server SERV 100 by means of the message CONFIG and/or to the available bit rate allocated to any transmission coming from or going to a community WLAN network with respect to a maximum available bit rate.

In a step 303, the residential gateway RGW1 111 makes the measurements required by the server SERV 100 and, in a step 304, the residential gateway RGW1 111 sends accordingly a measurement report in a message MES_P to the server SERV 100. The steps 303 and 304 are reiterated so that the server SERV 100 periodically receives such a measurement report from the residential gateway RGW1 111.

In addition, the server SERV 100 obtains such measurement reports from the residential gateway RGW1 111 on request. Thus, in a step 311, the server SERV 100 sends a request message REQ_MES to the residential gateway RGW1 111. By means of the message REQ_MES, the server SERV 100 instructs the residential gateway RGW1 111 to make operational-load measurements and to send a measurement report thereto by return. In a step 312, the residential gateway RGW1 111 then makes the measurements required by the server SERV 100 and, in a step 313, the residential gateway RGW1 111 sends accordingly a measurement report in a message MES_S to the server SERV 100.

Figure 4:
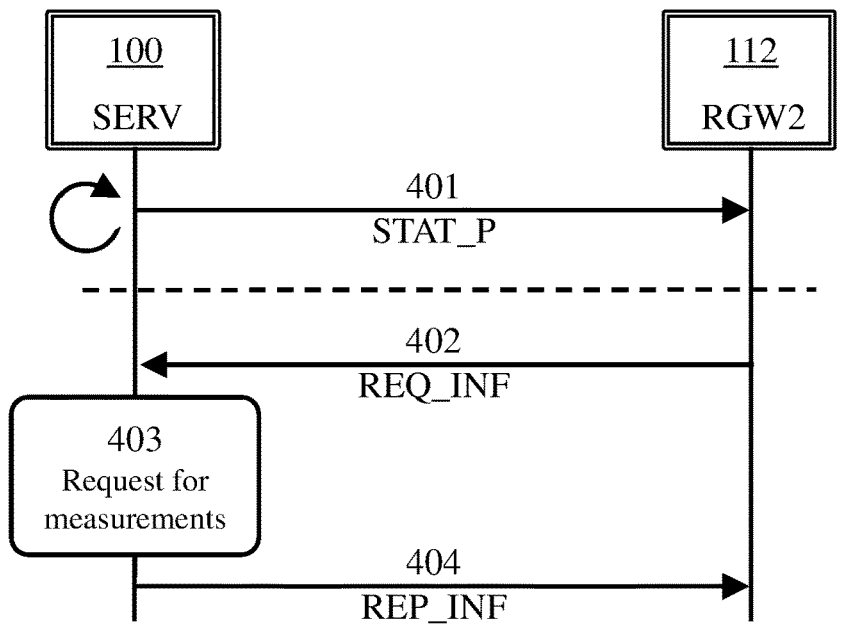
FIG. 4 illustrates schematically message exchanges in the context of a making available of statistics constructed by a server of the communication system.

FIG. 4 illustrates schematically message exchanges in the context of making available statistics constructed by the server SERV 100. These statistics serve to assist the access points AP of the community to help the mobile terminals to roam from a said community WLAN network to another said community WLAN network. These statistics are constructed from operational-load measurements received by the server SERV 100 from each of the access points AP of the community over the long term. These statistics indicate a mean long-term level of operational load for each access point AP of the community. This mean operational-load level may be presented in histogram form, the classes ("bins") of which define time slices (division by day, by hour, etc.).

Let us consider by way of illustration that the access point AP considered in the context of the algorithm in FIG. 4 is integrated in the residential gateway RGW2 112.

The server SERV 100 is configured to periodically transmit statistics to each access point AP of the community. Thus, in a step 401, the server SERV 100 sends, periodically, a message STAT_P to the residential gateway RGW2 112. The message STAT_P includes the aforementioned long-term statistics. The server SERV 100 does likewise for each other access point AP of the community. In order not to overload the traffic intended for each access point AP, only the statistics of certain access points AP of the community are transmitted periodically to a given access point AP (e.g. those in the vicinity, see list L, the construction of which is detailed below in relation to FIG. 5).

In addition, the residential gateway RGW2 112 obtains information, such as for example such statistics, from the server SERV 100, on request. This information may relate to instantaneous measurements made by the access points AP of the community, in order to know their respective current operational loads, but may also relate to long-term statistics. Let us consider the case where the residential gateway RGW2 112 wishes to obtain long-term statistics. Then, in a step 402, the residential gateway RGW1 112 sends a request message REQ_INF to the server SERV 100. In response to the message REQ_INF, the server SERV 100 requests other access points AP of the community, in a step 403, to make operational-load measurements, as already described in relation to FIG. 3, if the server SERV 100 does not have available sufficient operational-load measurements to derive sufficient statistics therefrom. The server SERV 100 limits its request to the access points AP of the community that are in the vicinity of the residential gateway RGW2 112 (see list L, the construction of which is detailed below in relation to FIG. 5). The server SERV 100 then constructs the information requested, from the measurement reports returned by the other access points AP of the community. Then, in a step 404, the server SERV 100 transmits to the residential gate way RGW2 112 a message REP_INF that includes said information. Each access point AP of the community is configured to do the same.

It should be noted that, by applying the same principle as described above in relation to the steps 402 to 404, an access point AP of the community can request information from the server SERV 100, such as updated operational-load measurements, concerning one or more other precise access points AP of the community (as known by means of the list L, the construction of which is detailed below in relation to FIG. 5). The message REQ_INF then indicates said other access point or points AP referred to. The server SERV 100 then requests said other access point or points AP to make operational-load measurements in the step 403. The message REP_INF then includes the information requested vis-à-vis said other access point or points AP.

Figure 5:
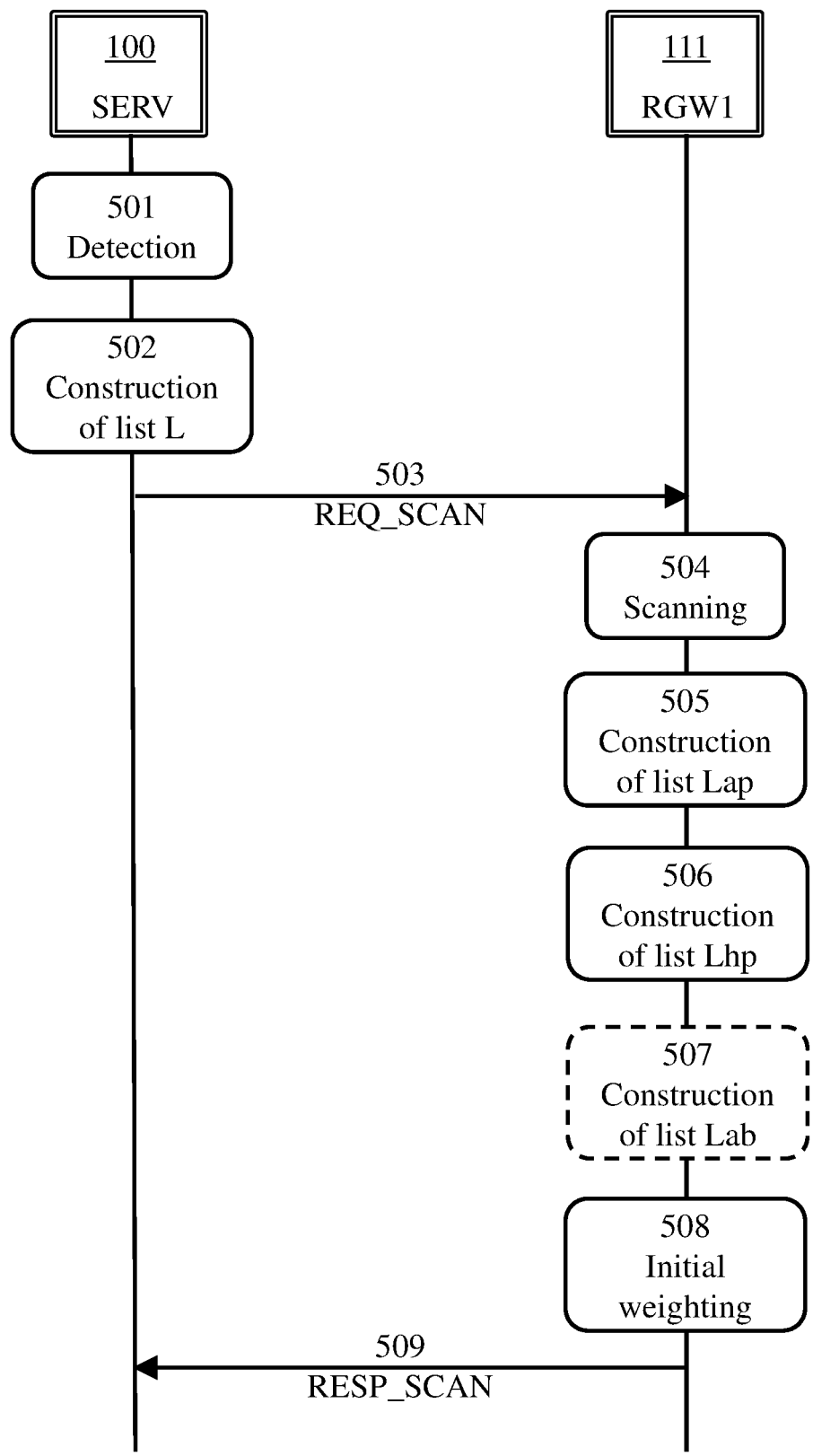
FIG. 5 illustrates schematically message exchanges in the context of an initialisation of lists relating to access points in the vicinity of another access point.

FIG. 5 illustrates schematically message exchanges in the context of an initialisation of lists relating to access points AP in the vicinity of another access point AP of the community.

In a step 501, the server SERV 100 detects the activation of an access point AP of the community. This detection follows the authentication already described in relation to FIG. 3. Let us consider by way of illustration that the server SERV 100 detects the activation of an access point AP integrated in the residential gateway RGW1 111.

In a step 502, the server SERV 100 constructs the list L mentioned in relation to FIG. 4. The list L is constructed by selecting all the access points AP of the community the geographical address of which (exact or supposed) is situated in a predefined radius of the access point AP detected at the step 501. The list L preferentially also includes an expected identifier, for example SSID, of each community WLAN network supposed to have been created by the listed access points AP.

In a step 503, the server SERV 100 sends a request message REQ_SCAN to the residential gateway RGW1 111. The request message REQ_SCAN instructs the residential gateway RGW1 111 to carry out a scan of communication channels that can be used by the access point AP of the community that is integrated in the residential gateway RGW1 111. The request message REQ_SCAN includes the list L constructed at the step 502.

The request message REQ_SCAN may specify which communication channel is used by each access point AP indicated in the list L. The server SERV 100 is in this case informed by each access point AP of the community at the creation of the community WLAN network concerned, or during the authentication if the community WLAN network was previously created, as well as at each change of communication channel by the access point AP in question. Information representing the communication channel used may in addition be sent by the access point AP in question at each notification of said access point AP that a connection or disconnection of a mobile terminal has occurred on the community WLAN network in question.

In a step 504, the residential gateway RGW1 111 carries out a scan on all the communication channels supported, or on the communication channels indicated in the request message REQ_SCAN (if such exists), for a period Tscan. This enables the residential gateway RGW1 111 to seek whether the access points AP of the list L are within radio range. This period Tscan can be adapted to the size of the list L and/or to the number of communication channels to be scanned.

The scan may consist of a passive phase, by the detection of beacons transmitted by any access point AP within radio range, and/or an active phase, by the sending of probe requests PReq specifying the name of the community WLAN network sought and listening for any probe responses PResp. It should be noted that the beacons transmitted include an identification of the WLAN network name concerned, and that it is therefore easy to filter the WLAN networks belonging to the community.

At the time of scanning, the residential gateway RGW1 111 measures the RSSI signal level relating to the signal that made it possible to detect each access point AP within radio range, and saves information representing said RSSI signal level measured in correspondence with the access point AP concerned.

In a step 505, the residential gateway RGW1 111 constructs a list Lap comprising an identification of each access point AP present in the list L and which is within radio range of the residential gateway RGW1 111, in association with the identifier of the community WLAN network detected and the RSSI signal level measured for said access point AP.

In a step 506, the residential gateway RGW1 111 constructs a list Lhp comprising an identification of each access point AP present in the list L but which is not within radio range of the residential gateway RGW1 111 (access points AP not detected during scanning).

In an optional step 507, the residential gateway RGW1 111 constructs a list Lab comprising an identification of each access point AP of the community detected during the scan, but which was not present in the list L, in association with the identifier of the community WLAN network detected.

In a step 508, the residential gateway RGW1 111 performs an initial weighting of each access point AP present in the list L, favouring the access points AP that are within radio range rather than the access points AP that are not within radio range. For example, considering weights ranging from 0 to 255, the residential gateway RGW1 111 attributes a weight less than 128 for the access points AP outside radio range (in the list Lhp) and a weight greater than or equal to 128 for the access points AP within radio range (in the list Lap). The residential gateway RGW1 111, in performing the initial weighting, favours the access points AP with the best RSSI signal levels measured. Other criteria may be used to define said weights.

In a step 509, the residential gateway RGW1 111 sends to the server SERV 100 a message RESP_SCAN, thus confirming the execution of the scan. The residential gateway RGW1 111 includes, in the message RESP_SCAN, the lists Lap and Lhp respectively constructed at the steps 505 and 506. The residential gateway RGW1 111 may also include in the message RESP_SCAN the list Lab obtained at the step 507.

If the list Lab obtained at the step 507 is not empty, the server SERV 100 can generate an alarm or launch an exception procedure. This means that at least one community WLAN network belonging to the community was not identified by the server SERV 100 as being within range of the residential gateway RGW1 111. An example of alarm consists of alerting the telecommunications operator managing the server SERV 100 of the presence of a foreign access point, in the vicinity of the residential gateway RGW1 111, which may potentially usurp community WLAN network identities (of the community managed by the server SERV 100). An example of an exception measurement is performing a reconfiguration at the server SERV 100 in order to take into account each new vicinity relationship declared by the list Lab, and to transmit accordingly, to each access point AP concerned, a new list L that is particular thereto.

In a particular embodiment, the residential gateway RGW1 111 includes in the message RESP_SCAN information representing the initial weighting made at the step 508. Otherwise the steps 508 and 509 can be reversed.

All the access points AP that are indicated in the list L constructed at step 502 must be updated in order to take into account the appearance in the community of the access point AP integrated in the residential gateway RGW1. The algorithm in FIG. 5 is then repeated as from the step 502 by the server SERV 100 for each access point AP that was listed in the list L transmitted to the residential gateway RGW1 (each then receiving its own updated list L).

In addition, when an access point AP of the community disappears, that is to say the communications are broken between the server SERV 100 and said access point AP, the algorithm in FIG. 5 is repeated for each access point AP that was listed in the list L previously transmitted to the access point AP that disappeared. The algorithm in FIG. 5 is then repeated as from the step 502 by the server SERV 100 for each access point AP that was listed in the list L previously transmitted to the access point AP that disappeared (each then receiving its own updated list L).

In a particular embodiment, rather than acting directly on detection of the appearance or disappearance of an access point AP of the community, the server SERV 100 periodically transmits, to the access points AP of the community, the state of the list L that is associated with them.

In a particular embodiment, each access point AP of the community can carry out a scan of its environment, e.g. periodically, without the server SERV 100 so requiring, in order to determine the characteristics of each communication channel (quantity of access points AP present in the vicinity, quantity of access points AP of the community present in the vicinity, noise level, degree of occupation of the communication channel, etc.).

Figure 6:
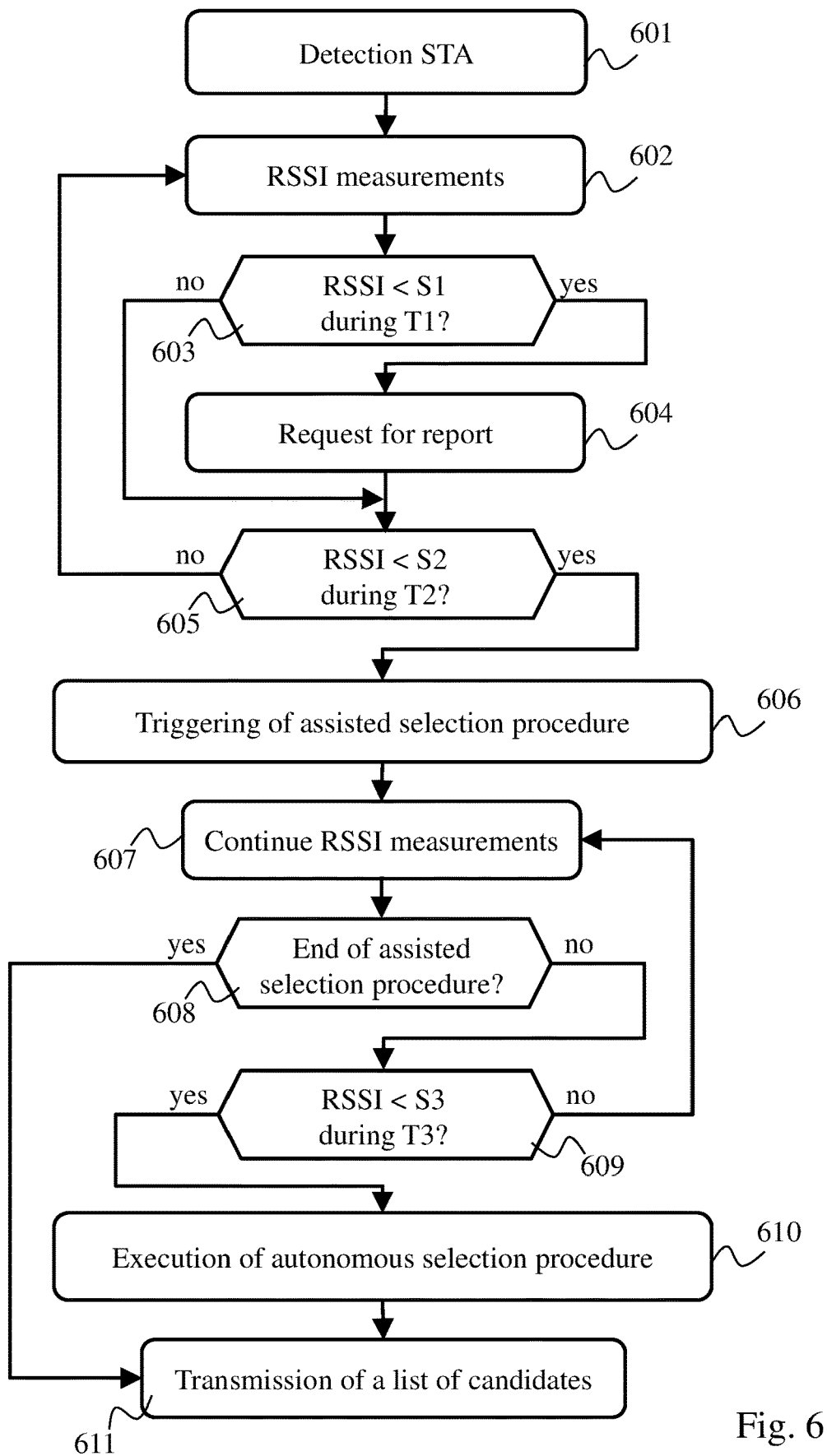
FIG. 6 illustrates schematically an algorithm assisting the roaming of a mobile terminal from a first community WLAN network to a second community WLAN network, the algorithm being implemented by an access point managing the first community WLAN network, according to a first embodiment.
Figure 7:
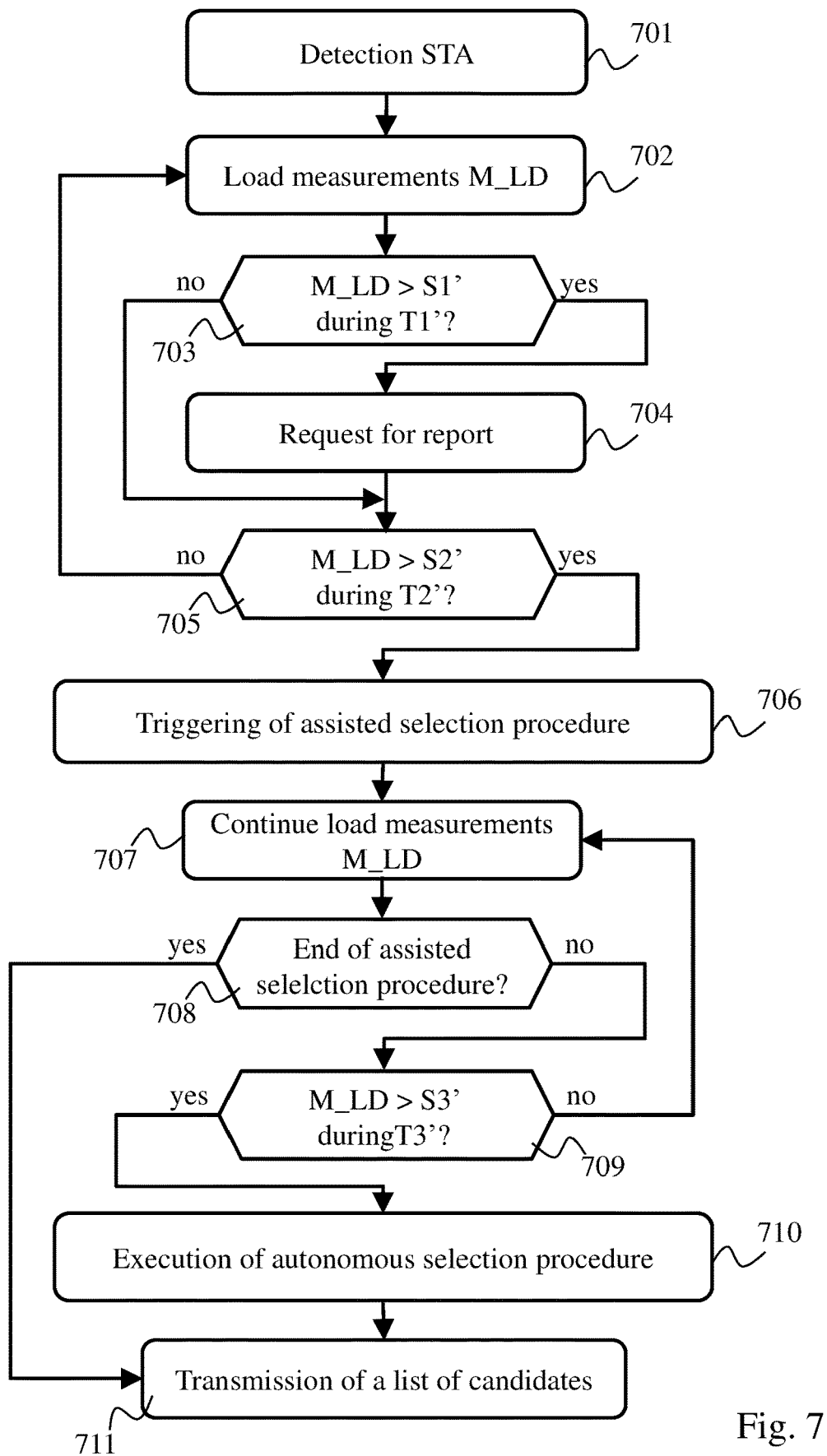
FIG. 7 illustrates schematically an algorithm assisting the roaming of a mobile terminal from the first community WLAN network to the second community WLAN network, the algorithm being implemented by the access point managing the first community WLAN network, according to a second embodiment.

FIGS. 6 and 7 illustrate schematically two embodiments such that, in an assisted selection procedure, an access point AP to which a mobile terminal is connected constructs a weighted list Ld, performing a weighting taking into account instantaneous measurements of operational load on candidate access points AP, said measurements being provided by the server SERV 100 following the triggering of the assisted selection procedure, and such that, in an autonomous selection procedure, the access point AP to which said mobile terminal is connected constructs the weighted list Ld, performing a weighting taking into account long-term statistics of operational load on said candidate access points, said statistics being supplied previously by the server.

FIG. 6 illustrates schematically an algorithm assisting the roaming of a mobile terminal from a first WLAN network of the community to a second WLAN network of the community, the algorithm being implemented by an access point AP managing the first community WLAN network, according to a first embodiment.

Let us consider by way of illustration that the access point AP considered in the context of the algorithm in FIG. 6 is integrated in the residential gateway RGW1 111.

In a step 601, the residential gateway RGW1 111 detects the presence of a mobile terminal connected to a community network WLAN managed by an access point AP integrated in said residential gateway RGW1 111.

In a step 602, the residential gateway RGW1 111 makes measurements of quality of radio communication with said mobile terminal, relying for example on the RSSI signal level relating to signals received from said mobile terminal. If the mobile terminal moves away from the residential gateway RGW1 111, the radio-communication quality measured by the residential gateway RGW1 111 drops over time. The residential gateway RGW1 111 is therefore capable of determining that a mobile terminal connected to the community WLAN network will potentially leave the radio coverage of said community WLAN network.

In a step 603, the residential gateway RGW1 111 checks whether the quality of radio communication with said mobile terminal (e.g. RSSI) measured is below a threshold S1 for a predefined time T1. If such is the case, the residential gateway RGW1 111 considers that it is necessary to collect data from said mobile terminal in order to prepare a possible leaving of the coverage of said community WLAN network, and a step 604 is performed; otherwise a step 605 is performed.

In the step 604, the residential gateway RGW1 111 requests said mobile terminal to provide a scanning report, insofar as said mobile terminal supports this functionality. The scan may consist of a passive phase, by detecting beacons transmitted by any access point AP within radio range, and/or an active phase, by sending probe requests PReq and listening for any responses PResp. The IEEE 802.11k amendment procedures can be used to do this. To facilitate the active phase, the residential gateway RGW1 111 may provide to said mobile terminal the list of access points AP entered in the list L. The residential gateway RGW1 111 may furthermore supply to said mobile terminal an identification of the communication channels used by the access points AP entered in the list Lap, and optionally an identification of the communication channels used by the access points AP entered in the list Lhp if the server SERV 100 has transmitted thereto. The scanning report includes identification of each access point AP detected, the name of each associated WLAN network, information representing a quality of communication with said access point AP (e.g. reception power of signals coming from said access point AP), preferentially an identification of a communication channel used, and preferentially a degree of temporal occupation of said communication channel used. Then step 605 is performed.

In the step 605, the residential gateway RGW1 111 checks whether the quality of radio communication with said mobile terminal (e.g. RSSI) measured is below a threshold S2 for a predefined time T2. The threshold S2 is below or equal to the threshold S1. If such is the case, the residential gateway RGW1 111 considers that said mobile terminal is under conditions of leaving coverage of said community WLAN network, and a step 606 is performed; otherwise the residential gateway RGW1 111 continues to make measurements of quality of radio communication with said mobile terminal by reiterating the step 602.

In the step 606, the residential gateway RGW1 111 triggers the assisted selection procedure. This procedure is a selection procedure, the purpose of which is to supply the weighted list Ld of access points AP that are candidates for the roaming of the mobile terminal. This selection procedure is said to be "assisted" in that the residential gateway RGW1 111 requests the assistance of the server SERV 100 for constructing the weighted list Ld. This assisted selection procedure is detailed below in relation to FIG. 8.

In a step 607, the residential gateway RGW1 111 continues the measurements of quality of radio communication with said mobile terminal, as described in relation to the step 602.

In a step 608, the residential gateway RGW1 111 checks whether the assisted selection procedure triggered at step 606 has succeeded. In other words, the residential gateway RGW1 111 checks whether the server SERV 100 has supplied data for assisting in the construction of the weighted list Ld, in which case the residential gateway RGW1 111 has been able to construct said weighted list Ld (see FIG. 8). If such is the case, a step 611 is performed; otherwise a step 609 is performed.

In the step 609, the residential gateway RGW1 111 checks whether the quality of radio communication with said mobile terminal (e.g. RSSI) measured is below a threshold S3 for a predefined time T3. The threshold S3 is below the threshold S2. If such is the case, the residential gateway RGW1 111 considers that said mobile terminal is at the limit of leaving coverage of said community WLAN network, and a step 610 is performed; otherwise the residential gateway RGW1 111 continues to make measurements of quality of radio communication with said mobile terminal by reiterating the step 607.

In the step 610, the residential gateway RGW1 111 triggers the autonomous selection procedure. This procedure is a selection procedure, the purpose of which is also to supply the weighted list Ld of access points AP that are candidates for the roaming of said mobile terminal, but the construction of this weighted list Ld is then not assisted directly by the server SERV 100, only the long-term statistics then being able to assist the residential gateway RGW1 111. This autonomous selection procedure is detailed below. At the end of the autonomous selection procedure, the residential gateway RGW1 111 has been able to construct said weighted list Ld. Then the step 611 is performed.

In the step 611, the residential gateway RGW1 111 sends the weighted list Ld to said mobile terminal. Said mobile terminal thus has a list of access points AP of the community to which a roaming of the mobile terminal can be performed, with a weight associated with each access point AP in the weighted list Ld in order to facilitate the decision making by said mobile terminal.

It should be noted that, should the duration T1 be greater than the duration T2 whereas the thresholds S1 and S2 are equal, the algorithm enters the case where the scanning ratio requested of the mobile terminal may not be available for constructing the weighted list Ld, and the weighting is then carried out without a scanning report.

FIG. 7 illustrates schematically an algorithm assisting the roaming of a mobile terminal from a first WAN network of the community to a second WLAN network of the community, the algorithm being implemented by an access point AP managing the first community WLAN network, in accordance with a second embodiment. The algorithm in FIG. 7 may be implemented as an alternative or in addition to that of FIG. 6.

Let us consider by way of illustration that the access point AP considered in the context of the algorithm in FIG. 7 is integrated in the residential gateway RGW1 111.

In a step 701, the residential gateway RGW1 111 detects the presence of a mobile terminal connected to a community WLAN network managed by said access point AP integrated in said residential gateway RGW1 111.

In a step 702, the residential gateway RGW1 111 makes measurements of operational load on said residential gateway RGW 111. The residential gateway RGW1 111 will seek to determine that said residential gateway RGW1 111 is tending towards its operational limit and that a roaming of the mobile terminal would be desirable in order to relax the operational constraint on said residential gateway RGW 111.

In a step 703, the residential gateway RGW1 111 checks whether the operational load measured is above a threshold S1' for a predefined time T1'. If such is the case, the residential gateway RGW1 111 considers that it is necessary to collect data from said mobile terminal in order to prepare for a possible overload on the residential gateway RGW1 111, and a step 704 is performed; otherwise a step 705 is performed.

In the step 704, the residential gateway RGW1 111 asks said mobile terminal to provide a scanning report. The scan may consist of a passive phase, by detecting beacons transmitted by any access point AP within radio range, and/or an active phase, by sending probe requests PReq and listening for any responses PResp. The IEEE 802.11k amendment procedures can be used to do this. To facilitate the active phase, the residential gateway RGW1 111 may supply to said mobile terminal the list of access points AP entered in the list L. The residential gateway RGW1 111 may furthermore supply to said mobile terminal an identification of the communication channels used by the access points AP entered in the list Lap, and optionally an identification of the communication channels used by the access points AP entered in the list Lhp if the server SERV 100 has transmitted thereto. The scanning report includes an identification of each access point AP detected, the name of each corresponding WLAN network, information representing a quality of communication with said access point AP (e.g. reception power of signals coming from said access point AP), preferentially an identification of the communication channel used, and preferentially a degree of temporal occupation of said communication channel used. Then the step 705 is performed.

In the step 705, the residential gateway RGW1 111 checks whether the operational load measured is above a threshold S2' for a predefined time T2'. The threshold S2' is above or equal to the threshold S1'. If such is the case, the residential gateway RGW1 111 considers that it is under conditions of occurrence of overload, and a step 706 is performed; otherwise the residential gateway RGW1 111 continues to make operational-load measurements by reiterating the step 702.

In the step 706, the residential gateway RGW1 111 triggers the assisted selection procedure. The residential gateway RGW1 111 thus requests the assistance of the server SERV 100 for constructing the weighted list Ld to be transmitted to the mobile terminal. As already indicated, this assisted selection procedure is detailed below in relation to FIG. 8.

In a step 707, the residential gateway RGW1 111 continues the measurements of operational load on said residential gateway RGW 111.

In a step 708, the residential gateway RGW1 111 checks whether the assisted selection procedure triggered at the step 706 has succeeded. In other words, the residential gateway RGW1 111 checks whether the server SERV 100 has supplied data for assisting the construction of the weighted list Ld, in which case the residential gateway RGW1 111 has been able to construct said weighted list Ld (see FIG. 8). If such is the case, a step 711 is performed; otherwise a step 709 is performed.

In the step 709, the residential gateway RGW1 111 checks whether the operational load measured is above a threshold S3' for a predefined time T3'. The threshold S3' is below the threshold S2'. If such is the case, the residential gateway RGW1 111 considers that it is at the overload limit, and a step 710 is performed; otherwise the residential gateway RGW1 111 continues to make operational-load measurements by reiterating the step 707.

In the step 710, the residential gateway RGW1 111 triggers the autonomous selection procedure. The autonomous selection procedure is detailed below. At the end of the autonomous selection procedure, the residential gateway RGW1 111 has been able to construct said weighted list Ld. Then the step 711 is performed.

In the step 711, the residential gateway RGW1 111 sends the weighted list Ld to said mobile terminal. Said mobile terminal thus has a list of access points AP of the community to which roaming of the mobile terminal can be performed, with a weight associated with each access point AP in said weighted list Ld in order to facilitate decision making by said mobile terminal.

The mobile terminal referred to in the context of the algorithm in FIG. 7 is for example a mobile terminal chosen arbitrarily among those connected to the access point AP of the residential gateway RGW1 111. According to another example, said mobile terminal is the one that has the least good quality of communication (e.g. RSSI) with the access point AP of the residential gateway RGW1 111. According to yet another example, said mobile terminal is the one that contributes most to the operational load on the residential gateway RGW1 111, and more particularly to the operational load on the WAN side.

It should be noted that, should the duration T1' be greater than the duration T2' whereas the thresholds S1' and S2' are equal, the algorithm enters the case where the scanning report requested of the mobile terminal may not be available for constructing the weighted list Ld, and the weighting is then made without a scanning report.

Whether it be in the context of the algorithm in FIG. 6 or in that of FIG. 7, any mobile terminal that receives the weighted list Ld remains in control of the roaming decision. Said mobile terminal can moreover decide not to perform roaming and to remain connected to the residential gateway RGW1 111. In the case of roaming, the mobile terminal is free not to switch to the access point AP of the weighted list Ld that has the highest weight. This is because the mobile terminal may take into account other criteria unknown to the access point AP (e.g. user preferences).

Figure 8:
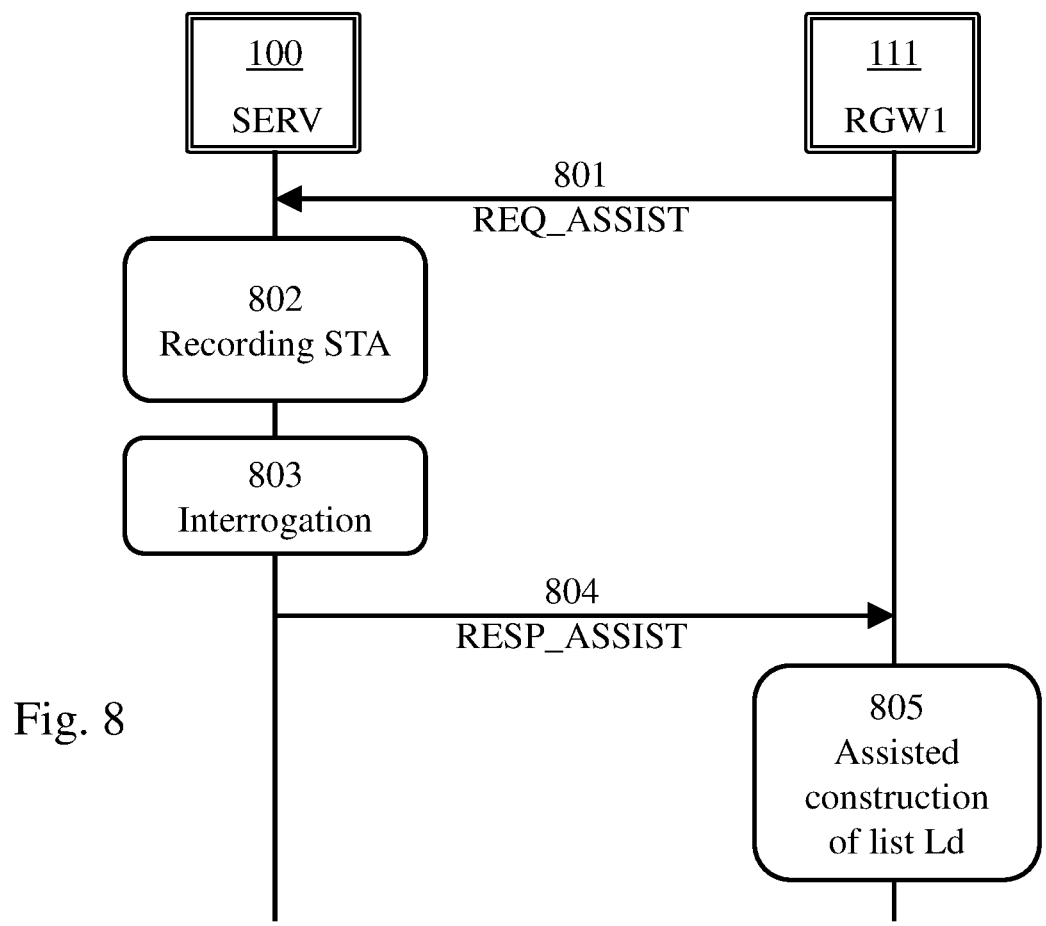
FIG. 8 illustrates schematically message exchanges in the context of a procedure for selecting WLAN networks that are candidates for the roaming assisted by the server of the communication system.

FIG. 8 illustrates schematically message exchanges in the context of the procedure for selecting WLAN networks that are candidates for roaming, assisted by the server SERV 100 (assisted selection procedure).

Let us consider by way of illustration that the access point AP considered in the context of the algorithm in FIG. 8 is integrated in the residential gateway RGW1 111.

In a step 801, the residential gateway RGW1 111 sends to the server SERV 100 an assistance request message REQ_ASSIST. By means of this message REQ_ASSIST, the residential gateway RGW1 111 notifies to the server SERV 100 the fact that a mobile terminal, identified in the message REQ_ASSIST, will no doubt be disconnected therefrom and that the residential gateway RGW1 111 wishes to recover information on the current operational load on the access points AP in the vicinity, in order to refine the weighted list Ld of candidates that it intends to offer to the mobile terminal in order to perform roaming. The residential gateway RGW1 111 may also indicate in the message REQ_ASSIST the weights currently allocated to each access point AP in the list of neighbours L previously supplied by the server SERV 100, particularly if these weights have changed since the previous execution of the algorithm in FIG. 5.

In a step 802, the server SERV 100 records the identifier of the mobile terminal in question in order to note that the mobile terminal in question should soon switch to another network (potentially a community WLAN network).

The server SERV 100 will then interrogate the access points AP in the list L associated with the access point integrated in the residential gateway RGW1 111. In order to reduce the number of requests, the server SERV 100 may interrogate only the access points AP within radio range of the residential gateway RGW1 111, as indicated in the list Lap associated with the access point integrated in the residential gateway RGW1 111.

In a particular embodiment, the server SERV 100 uses the weights supplied by the residential gateway RGW1 111 in the message REQ_ASSIST or those supplied at the end of the algorithm in FIG. 5. For example, the server SERV 100 interrogates a predefined number N>0 of access points AP in the list L or in the list Lap, the access points AP interrogated being those for which the highest weights were attributed as a preliminary by the residential gateway RGW1 111. According to another example, the server SERV 100 interrogates the access points AP in said list L or in said list Lap to which the residential gateway RGW1 111 has as a preliminary attributed weights above a predefined threshold SP.

Thus, in a step 803, the server SERV 100 interrogates said access points AP, requesting of them information on current operational load (see FIG. 3) and requesting of them whether they have recently detected said mobile terminal via aforementioned probe request messages PReq to which said access points AP are supposed to have replied with responses PResp. It should be noted that said access points AP keep tracks relating to the mobile terminals from which said access points AP have received probe request messages PReq. Such tracks are deleted after expiry of a predefined period of obsolescence. In a particular embodiment, a server SERV 100 states that it is awaiting a response from said access points AP at a maximum at the expiry of a period T4 for the operational-load information and at a maximum at the expiry of a period T5 for the detection of said mobile terminal. The server SERV 100 can thus request feedback as soon as possible (for example by indicating a nil value for the period T4 and/or the period T5). If the operational load information for certain access points AP has been obtained recently (i.e. previously obtained in a time less than a predefined duration T6 before the reception of the message REQ_ASSIST, e.g. by periodic return), then the server SERV 100 may dispense with interrogating these access points AP on their operational load information and only interrogate them on their detection or not of said mobile terminal, and use instead the last operational load information available thereto. Otherwise, the server SERV 100 specifically requests of these access points AP that they transfer to them their operational load information.

Each access point AP interrogated by the server SERV 100 with regard to operational load information then sends this information to the server SERV 100 at the latest at the expiry of a time delay initialised with the value T4. Each access point AP interrogated by the server SERV 100 with regard to a detection of said mobile terminal then sends its response at the latest at the expiry of a time delay initialised with the value T5. If said target access point AP has detected said mobile terminal, then said access point AP responds positively by time stamping the detection of said mobile terminal, and by indicating optionally an RSSI signal level of signals received from said mobile terminal; otherwise said access point AP responds in the negative, or even does not respond.

In a step 804, the server SERV 100 sends to the residential gateway RGW1 111 a message RESP_ASSIST that includes the operational load information obtained at the step 803. The server SERV 100 preferentially indicates which access points AP have detected said mobile terminal, as well as information representing the moment at which said mobile terminal was detected. The server SERV 100 sends the message RESP_ASSIST after expiry of a time T7≥max (T4, T5). If the server SERV 100 has not received any response from one of the access points AP at the step 803 before the end of the period T4 and/or T5, the server SERV 100 does not transmit the information concerned to the residential gateway RGW1 111. It should be noted that the exchange of messages REQ_ASSIST and RESP_ASSIST is a particular case of the exchange of messages REQ_INF and RESP_INF already described in relation to FIG. 4.

In a step 805, the residential gateway RGW1 111 constructs the weighted list Ld using the data contained in the message RESP_ASSIST. In other words, the residential gateway RGW1 111 performs an assisted construction of the weighted list Ld. The residential gateway RGW1 111 furthermore uses, if available, the scanning report requested of the mobile terminal in question at the step 604 or 704. For each access point AP that is a candidate for roaming, the residential gateway RGW1 111 associates a weight P preferentially calculated from a set of metrics in the following way:

the weight P depends on the weight attributed to said access point at the time of the initial weighting performed on reception of the list L (see FIG. 5) and/or the weight last attributed to said access point at the time of the last creation of the weighted list Ld by the residential gateway RGW1 111;

the weight P depends on the operational load on the communication interface on the WAN side of said access point AP; the less loaded the communication interface on the WAN side, the greater the weight P;

the weight P depends on the operational load on the communication interface on the WLAN side of said access point AP; the less loaded the communication interface on the WLAN side, the greater the weight P;

the weight P depends on the RSSI signal level with which said access point AP sees said mobile terminal; the higher the RSSI signal level, the greater the weight P, for example capping the value V_RSSI of the RSSI signal level in a range [−RSSImin; RSSImax] and applying the following formula $$\max(0, \min(1, (V\_RSSI-RSSImin)/(RSSImax; RSSImin)))$$

knowing that this value is here quantified over the range [0,1] (as then would be the other values taken into account for calculating the weight P) and is zero if the RSSI signal level for this access point AP is not available in the message RESP_ASSIST;

the weight P depends on the RSSI signal level with which said mobile terminal sees said access point AP according to the scanning report; the higher the RSSI signal level, the greater the weight P, for example capping the value V_RSSI' of the RSSI signal level in the range [−RSSImin; RSSImax] and applying the following formula $$\max(0, \min(1, (V\_RSSI'-RSSImin)/(RSSImax; RSSImin)))$$

knowing that this value quantified over the range [0,1] (like the other values taken into account for the calculation of the weight) and is zero if the RSSI signal level for this access point AP is not available in the scanning report.

In a particular embodiment, said weight P further depends on the number of roaming operations previously carried out successfully from the residential gateway RGW1 111 to said access point AP with which the weight P is associated; the higher this number, the greater the weight P. It is also possible to make the weight P depend on a number of roaming operations previously carried out successfully from the residential gateway RGW1 111 to said access point AP with which the weight P is associated (the higher this number, the greater the weight P; and/or a number of roaming operations that have previously failed from the residential gateway RGW1 111 to said access point AP with which the weight P is associated (the higher this number, the lower the weight P).

In a particular embodiment, when the scanning ratio requested at the step 604 or 704 is not available, the weight P depends on the inverse of the absolute value of the difference between the RSSI signal level measured by the residential gateway RGW1 111 for signals coming from said access point AP with which the weight P is associated and the RSSI signal level measured by the residential gateway RGW1 111 for signals coming from said mobile terminal.

Each of these metrics is preferentially associated with a predefined weighting coefficient, which makes it possible to favour one metric with respect to another.

As mentioned in relation to FIGS. 6 and 7, in the case where the assisted selection procedure fails through lack of time, the autonomous selection procedure is executed. The residential gateway RGW1 111 then constructs the weighted list Ld using the data available thereto. For each access point AP that is a candidate for roaming, the residential gateway RGW1 111 then associates a weight P' preferentially calculated as follows:
- the weight P' depends on the statistics (see the step 401) of loading of the communication interface on the WAN side of said access point AP; the less loaded the communication interface on the WAN side, the greater the weight P';
- the weight P' depends on the statistics (see the step 401) of loading of the communication interface on the WLAN side of said access point AP; the less loaded the communication interface on the WLAN side, the greater the weight P';
- the weight P' depends on the RSSI signal level with which said mobile terminal sees said access point AP according to the scanning report; the higher the RSSI signal level, the greater the weight P', for example by capping the value V_RSSI' of the RSSI signal level in the range [−RSSImin; RSSImax] and applying the following formula max(0, min(1, (V_RSSI'-RSSImin)/(RSSImax; RSSImin))

knowing that this value is quantified over the range [0,1] (as would then be the other values taken into account for calculating the weight P') and is nil if the RSSI signal level for this access point AP is not available in the scanning report.

In a particular embodiment, said weight P' further depends on the number of roaming operations previously performed successfully from the residential gateway RGW1 111 to said access point AP with which the weight P' is associated; the higher this number, the greater the weight P'. It is also possible to make the weight P' depend on the number of roaming operations previously performed successfully from the residential gateway RGW1 111 to said access point AP with which the weight P' is associated (the higher this number, the greater the weight P') and/or on the number of roaming operations that have previously failed from the residential gateway RGW1 111 to said access point AP with which the weight P' is associated (the higher this number, the greater the weight P').

In a particular embodiment, when the scanning report requested at the step 604 or 704 is not available, the weight P' depends on the inverse of the absolute value of the difference between the RSSI signal level measured by the residential gateway RGW1 111 for signals coming from said access point AP with which the weight P' is associated and the RSSI signal level measured by the residential gateway RGW1 111 for signals coming from said mobile terminal.

As in the context of the assisted selection procedure, each of these metrics is preferentially associated with a predefined weighting coefficient, which makes it possible to favour one metric with respect to another.

Whether it be according to the assisted selection procedure or according to the autonomous selection procedure, the residential gateway RGW1 111 constructs the weighted list Ld, indicating therein one or more access points AP of the community to which the mobile terminal in question can roam. Each access point AP listed is associated therein with the weight P or P' that the residential gateway RGW1 111 calculated for said access point AP. In the weighted list Ld, the weight P or P' may be standardised over the range [0; 255] in order to facilitate transmission thereof in an IEEE 802.11v frame. The residential gateway RGW1 111 may choose to limit the number of access points AP listed in the weighted list Ld transmitted, in order to limit the size of the frame necessary for sending the weighted list Ld to the mobile terminal in question.

In a particular embodiment, when a scanning report has been received from the mobile terminal in question in the context of the step 604 or of the step 704, the weighted list Ld transmitted to the mobile terminal lists only access points AP that have been detected by the mobile terminal during scanning.

FIGS. 9A and 9B illustrate schematically an algorithm for monitoring the roaming of a mobile terminal from a first community WLAN network to a second community WLAN network, the algorithm being implemented by an access point AP managing the first community WLAN network.

Let us consider by way of illustration that the algorithm in FIGS. 9A and 9B is implemented by the access point AP integrated in the residential gateway RGW1 111.

As detailed above in relation to FIGS. 6 and 7, the residential gateway RGW1 111 transmits the weighted list Ld in the step 610 or 710 respectively.

In a following step 901, the residential gateway RGW1 111 checks whether said residential gateway RGW1 111 has received a response from the mobile terminal in question before the expiry of a predefined period. If such is the case, a step 902 is performed; otherwise a step 910 is performed (in FIG. 9B).

In the step 902, the residential gateway RGW1 111 checks whether the mobile terminal has indicated in its response that it has accepted the roaming to another community WLAN network and, in which case, to which community WLAN network. If such is the case, a step 905 is performed; otherwise a step 904 is performed.

In the step 904, the residential gateway RGW1 111 cancels the roaming. The residential gateway RGW1 can update local statistics accordingly.

In the step 905, the residential gateway RGW1 111 updates local statistics, in order to record that roaming has been performed from the community WLAN network managed by the access point AP integrated in the residential gateway RGW1 111 to another WLAN network. It should be noted that the mobile terminal in question can roam to another WLAN network not belonging to the community, but all the same warn the residential gateway RGW1 111 thereof.

In the step 910, the residential gateway RGW1 111 checks whether the mobile terminal in question is still connected to the community WLAN network managed by the access point AP integrated in the residential gateway RGW1 111. If such is the case, a step 911 is performed; otherwise a step 912 is performed.

In the step 911, the residential gateway RGW1 111 cancels the roaming if the terminal in question is still connected without having responded after expiry of a predefined period. The residential gateway RGW1 can update local statistics accordingly. The residential gateway RGW1 111 may also apply a remedy to this situation. Thus, in a variant, the residential gateway RGW1 111 retransmits the weighted list Ld to the mobile terminal in question (up to a maximum number of times). In another variant, the residential gateway RGW1 111 decides to transmit the list L to the mobile terminal in question without weighting.

In the step 912, the residential gateway RGW1 111 checks whether said residential gateway RGW1 111 has received a notification from the server SERV 100 before the expiry of a predefined period T8. This notification indicates to the residential gateway RGW1 111 to which community WLAN network the mobile terminal in question has roamed in the case where said mobile terminal has decided to roam to a community WLAN network. This aspect is detailed below in relation to FIG. 10. If the residential gateway RGW1 111 has received such a notification, the step 913 is performed; otherwise the step 914 is performed.

In the step 913, the residential gateway RGW1 updates local statistics, taking into account information contained in the notification received from the server SERV 100, and more particularly with regard to the community access point AP to which the roaming was done, in the case where there has actually been roaming to a community LAN network.

In the step 914, the residential gateway RGW1 updates local statistics, taking account of the fact that the mobile terminal in question has performed roaming to a WLAN network that does not belong to the community managed by the server SERV 100 (or has quite simply lost any connection with any WLAN network).

FIG. 10 illustrates schematically message exchanges in the context of a roaming of a mobile terminal from a first community WLAN network to a second community WLAN network.

Let us consider by way of illustration roaming from the community WLAN network managed by the access point AP integrated in the residential gateway RGW1 111 to the community WLAN network managed by the access point AP integrated in the residential gateway RGW2 112.

In a step 1001, the residential gateway RGW2 112 detects the connection of a mobile terminal to the community WLAN network managed by the access point AP integrated in the residential gateway RGW2 112.

In a step 1002, the residential gateway RGW2 112 sends to the server SERV 100 a message DEC_STA identifying said mobile terminal.

In a step 1003, the server SERV 100 records the fact that said mobile terminal is now connected to the community WLAN network managed by the access point AP integrated in the residential gateway RGW2 112. If the server SERV 100 has at the step 802 recorded the fact that said mobile terminal was previously connected to the community WLAN network managed by the access point AP integrated in the residential gateway RGW1 111, the server SERV 100 knows that said mobile terminal has roamed from the community WLAN network managed by the access point AP integrated in the residential gateway RGW1 111 to the community WLAN network managed by the access point AP integrated in the residential gateway RGW2 112.

It should be noted that, if after a predefined period T9 the server SERV 100 has not been informed that the mobile terminal in question has roamed to another community WLAN network, the server SERV 100 deletes the recording made at the step 802, and may optionally nevertheless update statistics accordingly.

In a step 1004, the server SERV 100 updates statistics accordingly and, in a step 1005, the server SERV 100 sends a notification CONF_STA to the residential gateway RGW1 111 in order to inform it of the roaming of said mobile terminal from the community WLAN network managed by the access point AP integrated in the residential gateway RGW1 111 to the community WLAN network managed by the access point AP integrated in the residential gateway RGW2 112. The residential gateway RGW1 111 then performs the step 905 in order to update its statistics accordingly.

The invention claimed is:

1. A method for assisting roaming of a mobile terminal from a first community wireless local area network to a second community wireless local area network, the first and second community wireless local area networks belonging to a same community and being managed by respectively first and second access points offering access to a wide area network via which a server governing said community is accessible, wherein the method is implemented by the first access point and wherein the method comprises:
 making measurements on a quality of communication with said mobile terminal and/or of operational load on said first access point;
 when the measurements indicate that the quality of communication with said mobile terminal is below a first threshold (S2) and/or respectively that the operational load on said first access point is above a second threshold (S2'), triggering a selection procedure assisted by the server;
 when the measurements indicate that the quality of communication with said mobile terminal is below a third threshold (S3) that is below the first threshold (S2) and/or respectively that the operational load on said first access point is above a fourth threshold (S3') that is above the second threshold (S2'), triggering an autonomous selection procedure;
 at an end of the selection procedure assisted by the server or of the autonomous selection procedure, transmitting o the mobile terminal a weighted list (Ld) of access points that are candidates for the roaming of said mobile terminal;
 wherein, in the assisted selection procedure, the first access point constructs the weighted list (Ld) by performing a weighting taking into account instantaneous measurements of operational load on said candidate access points provided by the server following the triggering of the assisted selection procedure,
 and wherein, in the autonomous selection procedure, the first access point constructs the weighted list (Ld) by performing a weighting taking into account long-term statistics of operational load on said candidate access points provided previously by the server.

2. The method according to claim 1, wherein the first access point periodically receives updates of the long-term statistics coming from the server.

3. The method according to claim 1, further comprising:
 when the measurements indicate that the quality of communication with said mobile terminal is below a fifth threshold (S1) that is higher than or equal to the first threshold (S2) and/or respectively that the operational load on said first access point is above a sixth threshold (S1') that is below or equal to the second threshold (S2'), requesting from said mobile terminal a scanning report indicating which access points are detected by said mobile terminal; and performing the weighting taking into account the scanning report received from the mobile terminal.

4. The method according to claim 3, wherein first access point lists, in the weighted list (Ld), only access points detected by said mobile terminal and which are indicated in the scanning report.

5. The method according to claim 3, further comprising:
receiving, from the server, a list (L) of access points managing community wireless local area networks belonging to said community and a geographical address of which is situated within a predefined radius of said first access point;
performing a scanning for creating a list (Lap) identifying which access points in the list (L) are within radio range of said first access point and a list (Lhp) identifying which access points in the list (L) are out of radio range of said first access point; and
performing an initial weighting on a basis of the lists (Lap) and (Lhp).

6. The method according to claim 5, further comprising:
creating a list (Lab) identifying access points belonging to said community that were detected by said first access point during the scanning by said first access point and which were not listed in the list (L); and
transmitting the list (Lab) to the server.

7. The method according to claim 5, wherein, in the assisted selection procedure, the server performs:
requesting each access point in the list (L) to provide instantaneous measurements of operational load on said access point, and to provide information indicating whether said access point detects said mobile terminal; and
informing said first access point of the instantaneous measurements of operational load received from said access points and providing the information indicating respectively whether said access points have detected said mobile terminal.

8. The method according to claim 7, wherein, in the assisted selection procedure, the first access point associates, with each access point listed in the weighted list (Ld), a weight (P) calculated from a set of metrics in the following way:
the weight (P) depends on the weight attributed to said access point during the initial weighting and/or on the weight lastly attributed to said access point at a time of the last creation of the weighted list (Ld) by the first access point;
the weight (P) depends on the operational load on a communication interface on the wide area network side of said access point;
the weight (P) depends on the operational load on a communication interface on the community wireless local area network side of said access point;
the weight (P) depends on an RSSI signal level with which said access point detects said mobile terminal;
the weight (P) depends on an RSSI signal level with which said mobile terminal detects said access point AP according to the scanning report received from said mobile terminal.

9. The method according to claim 8, wherein said weight (P) further depends on an amount of roaming operations previously performed successfully from the first access point to the access point with which the weight (P) is associated.

10. The method according to claim 8, wherein, when the scanning report requested of said mobile terminal is not available, the weight (P) depends on the inverse of the absolute value of the difference between an RSSI signal level measured by the first access point for signals coming from said access point with which the weight (P) is associated and an RSSI signal level measured by the first access point for signals coming from said mobile terminal.

11. The method according to claim 7, wherein, in the autonomous selection procedure, the first access point associates, with each access point listed in the weighted list (Ld), a weight (P') calculated from a set of metrics in the following manner:
the weight (P') depends on a statistic of load of the communication interface on the wide area network side of said access point;
the weight (P') depends on a statistic of load of the communication interface on the community wireless local area network side of said access point;
the weight P' (P') depends on an RSSI signal level with which said mobile terminal detects said access point according to the scanning report received from said terminal.

12. The method according to claim 11, wherein said weight (P') further depends on an amount of roaming operations previously performed successfully from the first access point to the access point with which the weight (P') is associated.

13. The method according to claim 11, wherein, when the scanning report requested of said mobile terminal is not available, the weight (P') depends on the inverse of the absolute value of the difference between an RSSI signal level measured by the first access point for signals coming from said access point with which the weight (P') is associated and an RSSI signal level measured by the first access point for signals coming from said mobile terminal.

14. The method according to claim 1, wherein, after roaming of the mobile terminal, the second access point informs the server of said roaming, and the server next informs the first access point of said roaming.

15. The method according to claim 1, wherein the first and second community wireless local area networks are of a Wi-Fi type.

16. Non-transitory information storage medium storing a computer program comprising instructions for implementing, by a processor, the method according to claim 1, when said program is executed by said processor.

17. A first access point configured to assist roaming of a mobile terminal from a first community wireless local area network to a second community wireless local area network, the first and second community wireless local area networks belonging to a same community and being managed by respectively the first access point and a second access point, the first and second access points offering access to a wide area network via which a server governing said community is accessible, wherein the first access point comprises electronic circuitry configured for:
making measurements of a quality of communication with said mobile terminal and/or of operational load on said first access point;
when the measurements indicate that the quality of communication with said mobile terminal is below a first threshold (S2) and/or respectively that the operational load on said first access point is above a second threshold (S2'), triggering a selection procedure assisted by the server;

when the measurements indicate that the quality of communication with said mobile terminal is below a third threshold (S3) that is below the first threshold (S2) and/or respectively that the operational load on said first access point is above a fourth threshold (S3') that is above the second threshold (S2'), triggering an autonomous selection procedure;

at the an end of the selection procedure assisted by the server or of the autonomous selection procedure, transmitting to the mobile terminal a weighted list (Ld) of access points that are candidates for the roaming of said mobile terminal;

wherein, in the assisted selection procedure, the electronic circuitry is configured for constructing the weighted list (Ld) by performing a weighting taking into account instantaneous measurements of operational load on said candidate access points provided by the server following the triggering of the assisted selection procedure, and wherein, in the autonomous selection procedure, the electronic circuitry is configured for constructing the weighted list (Ld) by performing a weighting taking into account long-term statistics of operational load on said candidate access points supplied previously by the server.

* * * * *